United States Patent
Li et al.

(10) Patent No.: US 12,253,708 B2
(45) Date of Patent: Mar. 18, 2025

(54) FRONT LIGHT SOURCE MODULE AND METHOD FOR MANUFACTURING SAME, AND DISPLAY DEVICE

(71) Applicants: Hefei BOE Optoelectronics Technology Co., Ltd., Anhui (CN); BOE Technology Group Co., Ltd., Beijing (CN)

(72) Inventors: Hu Li, Beijing (CN); Jianghui Zhan, Beijing (CN); Douqing Zhang, Beijing (CN); Liangliang Zheng, Beijing (CN)

(73) Assignees: Hefei BOE Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/279,087

(22) PCT Filed: Nov. 25, 2022

(86) PCT No.: PCT/CN2022/134485
§ 371 (c)(1),
(2) Date: Aug. 28, 2023

(87) PCT Pub. No.: WO2024/108593
PCT Pub. Date: May 30, 2024

(65) Prior Publication Data
US 2025/0012962 A1    Jan. 9, 2025

(51) Int. Cl.
*F21V 8/00* (2006.01)
(52) U.S. Cl.
CPC ......... *G02B 6/0043* (2013.01); *G02B 6/0036* (2013.01); *G02B 6/0065* (2013.01)

(58) Field of Classification Search
CPC ... G02B 6/0036; G02B 6/0043; G02B 6/0065
See application file for complete search history.

(56) References Cited

U.S. PATENT DOCUMENTS

2013/0040073 A1    2/2013 Pett et al.
2018/0356687 A1    12/2018 Ou et al.

FOREIGN PATENT DOCUMENTS

| CN | 102918093 A | 2/2013 |
|---|---|---|
| CN | 203336480 U | 12/2013 |

(Continued)

OTHER PUBLICATIONS

Handbook of Pressure Sensitive Adhesive Products and Technology, edited by Yukun Yang and Fengting LV, pp. 390-391, Beijing: Chemical Industry Press, Mar. 2014.

*Primary Examiner* — Karabi Guharay
(74) *Attorney, Agent, or Firm* — IPro, PLLC

(57) ABSTRACT

Provided is a front light source module. The front light source module is configured to be arranged on a display side of a reflective display, and the front light source module comprises: a light guide plate and an edge-lit light source; wherein a light exit surface of the light source faces a side of the light guide plate; and a plurality of dots and a plurality of release coatings in one-to-one correspondence to the plurality of dots are disposed on a first surface of the light guide plate, and an orthographic projection of the release coating on a second surface of the light guide plate is overlapped with an orthographic projection of the dot corresponding to the release coating on the second surface of the light guide plate.

20 Claims, 6 Drawing Sheets

(56) References Cited

FOREIGN PATENT DOCUMENTS

| CN | 107065309 A | 8/2017 |
| CN | 108562964 A | 9/2018 |
| CN | 214335425 U | 10/2021 |

FRONT LIGHT SOURCE MODULE AND METHOD FOR MANUFACTURING SAME, AND DISPLAY DEVICE

CROSS-REFERENCE TO RELATED APPLICATION

This application is a U.S. national phase application based on PCT/CN2022/134485, filed on Nov. 25, 2022, the disclosure of which is incorporated herein by reference in its entirety.

TECHNICAL FIELD

The present disclosure related the field of display technology, and in particular to a front light source module and a method for manufacturing the same, and a display device.

BACKGROUND

With continuous developments of the display technology, a variety of display devices have appeared on the market. The reflective display device utilizes the ambient light as the illumination source to display images, which has the advantages of soft light and low energy consumption. Therefore, the reflective display devices have been more and more widely used.

SUMMARY

Embodiments of the present disclosure provide a front light source module and a method for manufacturing the same, and a display device. The technical solutions are described as follows.

According to some embodiments of the present disclosure, a front light source module is provided, configured to be arranged on a display side of a reflective display, the front light source module including a light guide plate and an edge-lit light source; wherein
 a light output exit surface of the light source faces a side of the light guide plate;
 a plurality of dots and a plurality of release coatings in one-to-one correspondence to the plurality of dots are disposed on a first surface of the light guide plate, and an orthographic projection of the release coating on a second surface of the light guide plate is overlapped with an orthographic projection of the dot corresponding to the release coating on the second surface of the light guide plate;
 wherein the first surface and the second surface are two planar surfaces of the light guide plate opposite to each other, and in to the case that the front light source module is disposed on the display side of the reflective display, the second surface of the light guide plate is closer to the reflective display relative to the first surface of the light guide plate.

In some embodiments, orthographic projection of the dot on the second surface of the light guide plate is within the orthographic projection of the release coating corresponding to the dot on the second surface of the light guide plate.

In some embodiments, a size of the orthographic projection of the release coating on the second surface of the light guide plate is greater than a size of the orthographic projection of the dot corresponding to the release coating on the second surface of the light guide plate.

In some embodiments, in a region including any two of the dots in the first surface of the light guide plate, a ratio of a sum of areas of orthographic projections of the release coatings in the region on the light guide plate to an area of the region is less than 50%.

In some embodiments, materials configured to make the release coating includes at least one of a silicone oil, a release agent and a hydrophobic agent.

In some embodiments, the dots are depressed dots, and a depth of the dots in a direction perpendicular to the first surface ranges from 2 micrometers to 10 micrometers.

In some embodiments, a density of the dots on the first surface of the light guide plate gradually increases in a direction away from the light source.

In some embodiments, a difference, in any direction, between a width of the orthographic projection of the release coating on the second surface of the light guide plate and a width of the orthographic projection of the dot corresponding to the release coating on the second surface of the light guide plate is greater than or equal to two times of a target width;
 wherein the target width is a maximum error width for aligning the light guide plate with a template, the template has a plurality of openings in one-to-one correspondence to the plurality of dots, and the openings are configured to prepare the release coatings at locations of the corresponding dots.

In some embodiments, a display device is provided, including: a reflective display, and a front light source module disposed on a display side of the reflective display, wherein the front light source module is the front light source module as described in any one of the above.

In some embodiments, the display device further includes: a cover plate disposed on a side, distal from the reflective display, of the light guide plate in the front light source module, and an adhesive layer disposed between the cover plate and the light guide plate, wherein the adhesive layer is bonded to the cover plate and the light guide plate.

In some embodiments, an orthographic projection of the adhesive layer on the first surface of the light guide plate covers the plurality of dots on the first surface of the light guide plate.

In some embodiments, the adhesive layer is in contact with the first surface of the light guide plate and is separated from the dots.

In some embodiments, a method for manufacturing a front light source module is provided, including:
 forming a plurality of release coatings on a first surface of a light guide plate, wherein a plurality of dots are disposed on the first surface of the light guide plate, the plurality of dots are in one-to-one correspondence to the plurality of release coatings, an orthographic projection of the release coating on a second surface of the light guide plate is overlapped with an orthographic projection of the dot corresponding to the release coating on the second surface of the light guide plate;
 acquiring the front light source module by mounting an edge-lit light source on a side of the light guide plate with a light output exit surface of the light source facing the side of the light guide plate;
 wherein the first surface and the second surface are two planar surfaces of the light guide plate opposite to each other, and in the case that the front light source module is disposed on the display side of the reflective display, the second surface of the light guide plate is closer to the reflective display relative to the first surface of the light guide plate.

In some embodiments, forming the plurality of release coatings on the first surface of the light guide plate includes:

placing a template having a plurality of openings on a side, distal from the second surface of the light guide plate, of the first surface of the light guide plate, and aligning the template with the light guide plate, such that orthographic projections of the plurality of openings on the light guide plate covers the plurality of dots; and making the plurality of release coatings on the first surface of the light guide plate by using the template.

In some embodiments, the template is a reticular plate, and making the plurality of release coatings on the first surface of the light guide plate includes:

placing a release solvent on a side, distal from the light guide plate, of the reticular plate;

causing the release solvent to flow through the openings to the first surface of the light guide plate by moving a scraper on a reticular surface of the reticular plate; and acquiring the plurality of release coatings by applying a fixing treatment to the release solvent on the first surface of the light guide plate;

or, the template is a mask plate, and making the plurality of release coatings on the first surface of the light guide plate includes:

acquiring a release film in a whole layer by applying a release solvent on the first surface of the light guide plate and curing the release solvent; and acquiring the plurality of release coatings by patterning the release film using the mask plate.

In some embodiments, prior to making the plurality of release coatings on the first surface of the light guide plate, the method includes:

acquiring the release solvent by mixing a solvent containing a release material with a cross-linking agent and a curing agent in a predetermined ratio;

wherein the release material includes at least one of a silicone oil, a release agent and a hydrophobic agent.

BRIEF DESCRIPTION OF DRAWINGS

In order to describe the technical solutions in the embodiments of the present disclosure more clearly, the following briefly describes the accompanying drawings required for describing the embodiments. Apparently, the accompanying drawings in the following description show merely some embodiments of the present disclosure, and those of ordinary skill in the art can still derive other drawings from these accompanying drawings without creative efforts.

DETAILED DESCRIPTION

In order to make the objects, technical solutions and advantages of the present disclosure clearer, embodiments of the present disclosure are described in further detail below in conjunction with the accompanying drawings.

A reflective display device is a display device capable of utilizing ambient light as an illumination source for display. In order to ensure the display effect of the reflective display device when the ambient light is insufficient, a front light source module is usually provided in the reflective display device to assist the reflective display device in display. The reflective display device is usually provided with a front light source module and a reflective display. The front light source module usually includes a light guide plate and a light source. A plurality of dots are disposed on a side, distal from the reflective display, of the light guide plate. After the light emitted from the light source enters the light guide plate, the light is fully reflected in a non-dot region inside the light guide plate, and the full reflection of the light at the dots is destroyed, such that the light is reflected by the dots toward the reflective display, and the reflective display device is capable of normally displaying images in a dim environment.

Figure 1:
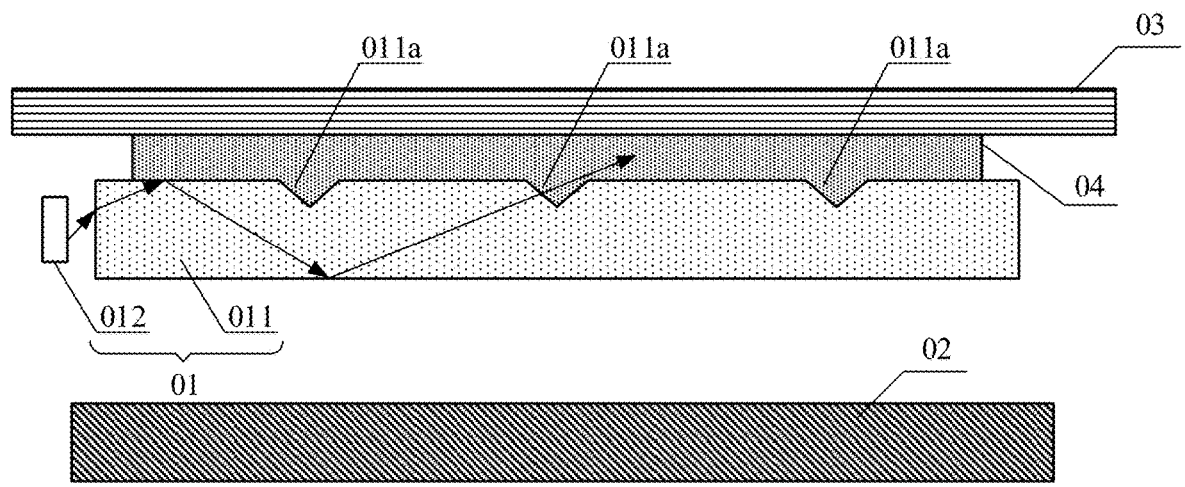
FIG. 1 is a schematic diagram of a film layer structure of a currently common reflective display device.

Referring to FIG. 1, FIG. 1 is a schematic diagram of a film layer structure of a currently common reflective display device 00. The reflective display device 00 includes a front light source module 01 and a reflective display 02. The front light source module 01 is usually provided on a display side of the reflective display 02. In the case that the ambient light in the external environment is strong, the front light source module 01 is in a down state, and the ambient light is directed to the reflective display 02, such that the reflective display 02 reflects the ambient light and then present a corresponding display screen. In the case that the ambient light in the external environment is insufficient, the front light source module 01 is in an up state, and the light emitted from the front light source module 01 is directed to the reflective display 02, such that the reflective display 02 can reflect the light and present the corresponding display screen.

The front light source module 01 includes a light guide plate 011 and an edge-lit light source 012 disposed on one side of the light guide plate 011. The light emitting surface of the light source 012 faces the side of the light guide plate 011, and the light emitted from the light source 012 enters into the light guide plate 011 from this side and propagate within the light guide plate 011. A plurality of dots 011a are disposed on the side, distal away from the reflective display, of the light guide plate 011. In the case that the light emitted from the light source 012 enters the light guide plate 011, the light can be fully reflected in the non-dot region of the light guide plate 011. And the total reflection of the light is broken at the dots 011a, allowing the light to be reflected by the dots 011a toward the reflective display.

The reflective display device 00 also typically includes a cover plate 03 disposed on the side, distal from the reflective display device, of the front light source module 01, and the cover plate 03 is typically bonded to the light guide plate 011 of the front light source module 01 by an adhesive layer 04.

However, the dots 011a in the light guide plate 011 are usually depressed dots, and in the case that the light guide plate 011 is bonded to the cover plate 03 by the adhesive layer 04, the adhesive in the adhesive layer 04 is very likely to enter the dots 011a. In the case that the adhesive in the adhesive layer 04 enters the dot 011a, the dot 011a is not able to reflect light to the reflective display 02. In order to reduce the probability that the adhesive enters the dot 011a, the relevant technology mainly adopts the following two methods.

Figure 2:
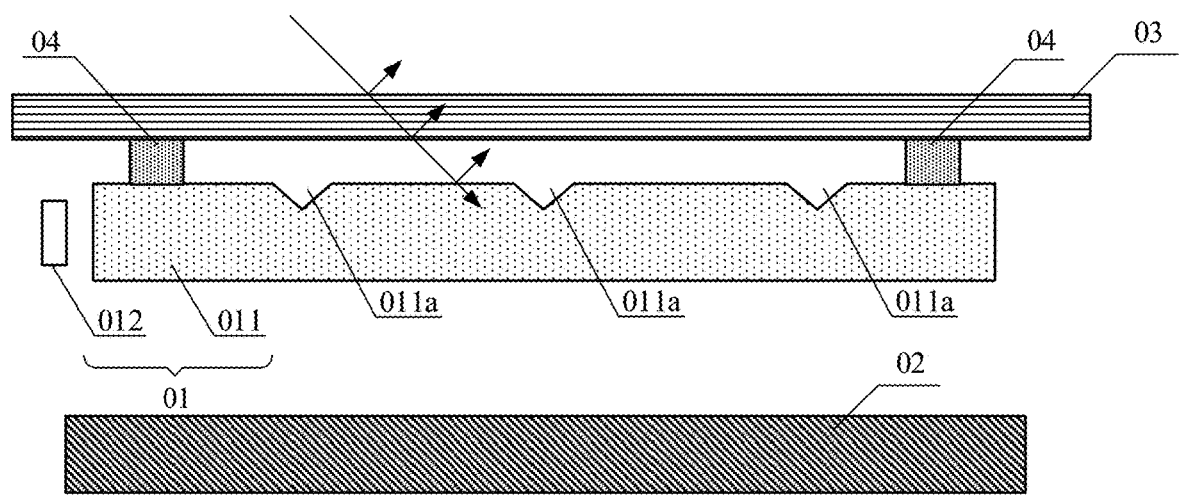
FIG. 2 is a schematic diagram of a film layer structure of still another currently common reflective display device.

In a first method, referring to FIG. 2, FIG. 2 is a schematic diagram of the structure of a film layer of another currently common reflective display device. The adhesive layer 04 between the light guide plate 011 and the cover plate 03 is provided as a ring frame adhesive, and it is necessary to ensure that this adhesive layer 04 is distributed around a plurality of dots 011a within the light guide plate 011. In this way, although the adhesive within the adhesive layer 04 do not enter the dots 011a, an air medium is present between the light guide plate 011 and the cover plate 03, and in the case that the front light source module 01 is in the down state, some of the light in the ambient light directed into the reflective display device 00 is reflected at the upper and lower interfaces of the air medium, and the reflected light is not able to enter the reflective display 02, resulting in a lower brightness of the reflective display 02 when displaying a screen, which in turn results in a poorer display effect of the reflective display device 00.

Figure 3:
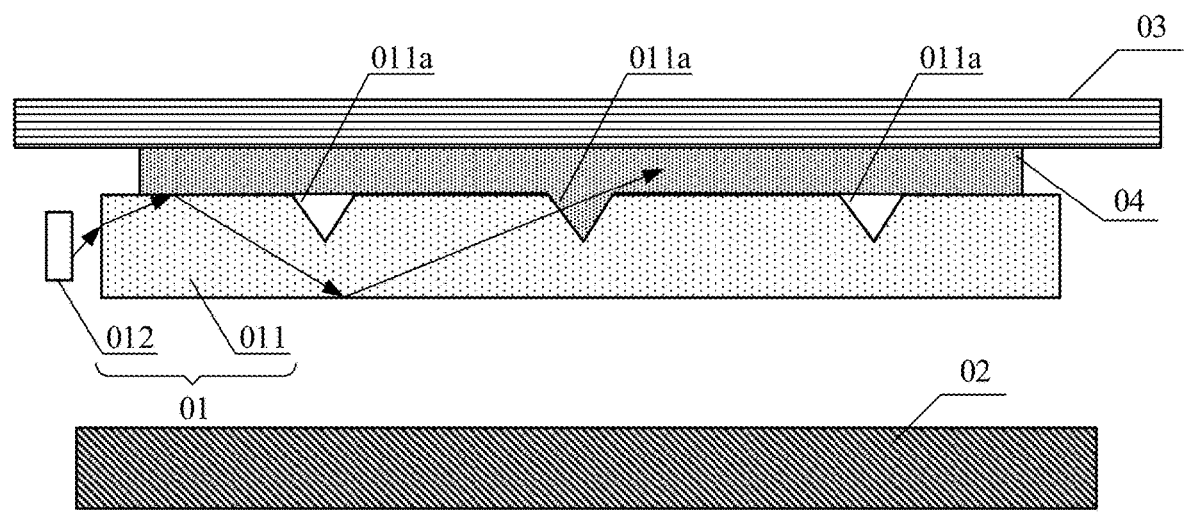
FIG. 3 is a schematic diagram of a film layer structure of still another currently common reflective display device.

In a second method, referring to FIG. 3, FIG. 3 is a schematic diagram of a film layer structure of still another currently common reflective display device. The size of the dot 011a provided within the light guide plate 011 can be increased such that the adhesive layer 04 disposed between the light guide plate 011 and the cover plate 03 easily enters into the dot 011a. However, the adhesive layer 04 has a strong bonding ability with the surface of the light guide plate 011, and in the case that the reflective display device 00 is subjected to vacuum de-foaming treatment, or, in the case that the reflective display device 00 is subjected to pressing during use, a portion of the adhesive in the adhesive layer 04 also enters into the dot 011a and is bonded to the surface of the dot 011a, which results in the adhesive entering into the dot 011a not being able to be pulled out, and causes the dot 011a to no longer be able to reflect light toward the reflective display 02, which in turn causes the poor display effect of the reflective display device 00.

Figure 4:
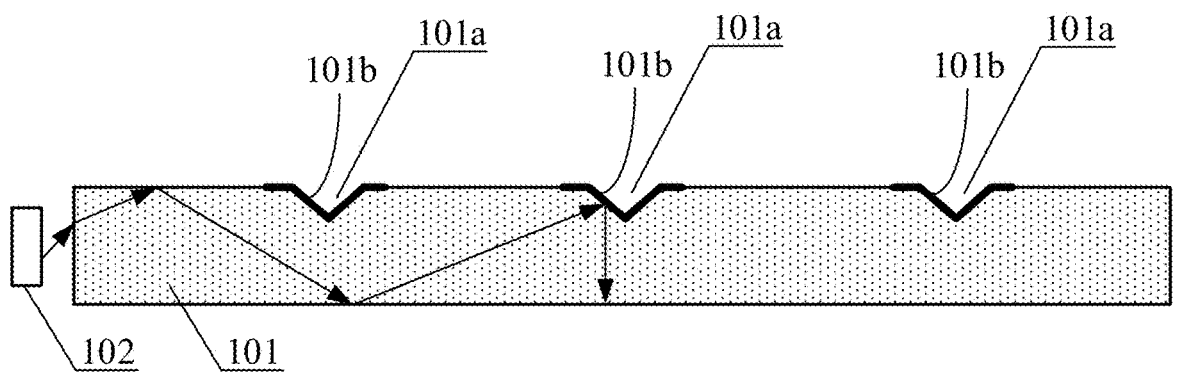
FIG. 4 is a schematic diagram of a film layer structure of a front light source module according to some embodiments of the present disclosure.

Embodiments of the present disclosure provide a front light source module, integratable into a display device. The display device includes a reflective display, and the front light source module is arranged on the display side of the reflective display in the display device. Referring to FIG. 4, FIG. 4 is a schematic diagram of a film layer structure of a front light source module according to some embodiments of the present disclosure. The front light source module 100 includes a light guide plate 101 and an edge-lit light source 102.

The light output exit surface of the light source 102 in the front light source module 100 faces a side of the light guide plate 101. In this way, in the case that the light source 102 is in the up state, the light emitted from the light source 102 is directed from the side of the light guide plate 101 to the interior of the light guide plate 101.

Figure 5:
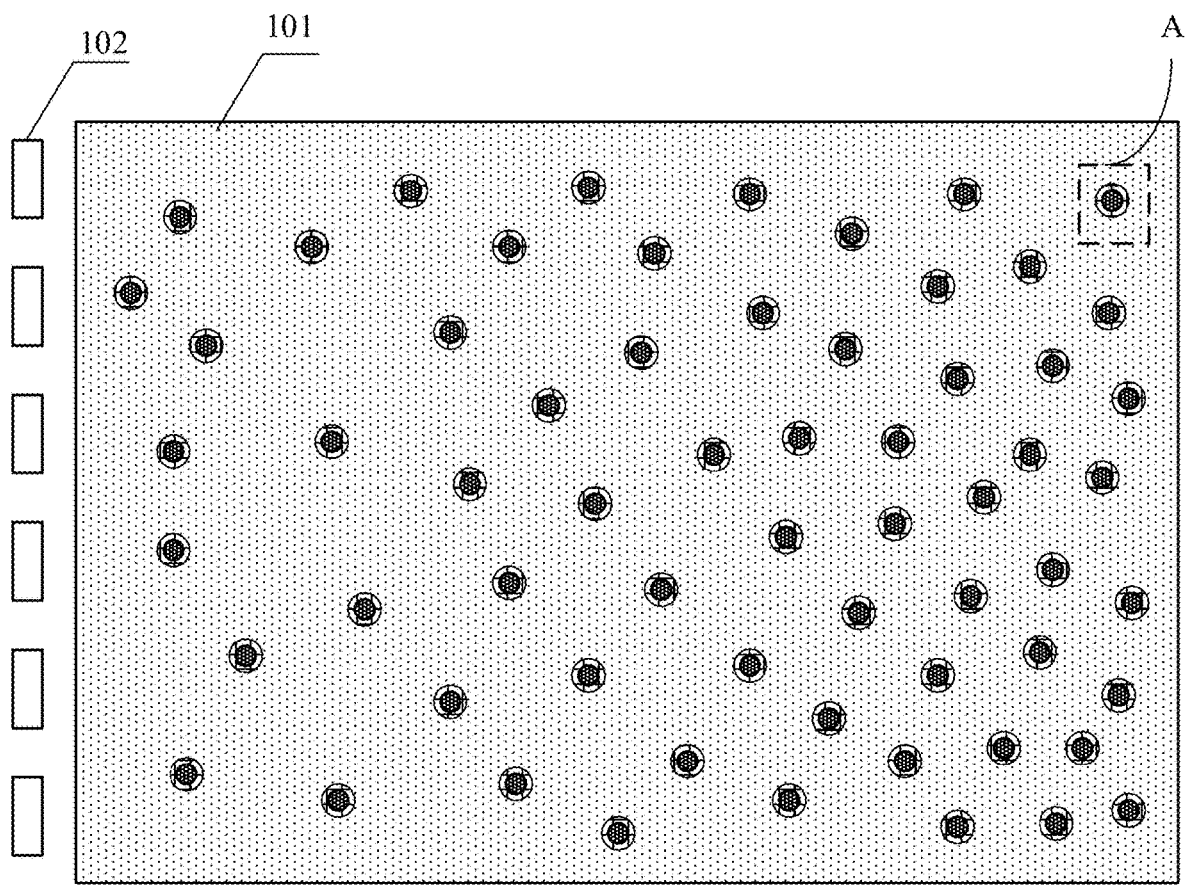
FIG. 5 is a top view of the front light source module illustrated in FIG. 4.
Figure 6:
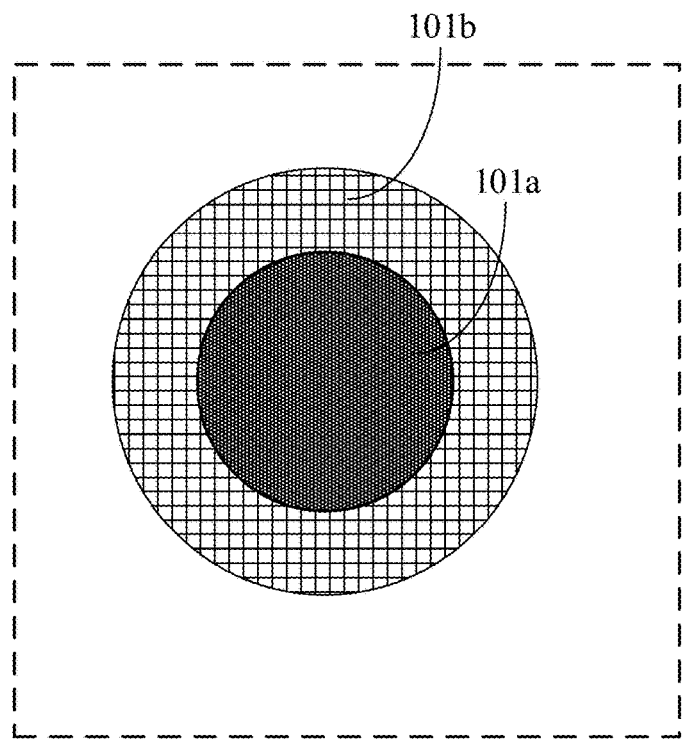
FIG. 6 is a partially enlarged view of the front light source module illustrated in FIG. 5 at position A.

A plurality of dots 101a and a plurality of release coatings 101b are disposed on the first surface of the light guide plate 101 in the front light source module 100, and the plurality of dots 101a are in one-to-one correspondence to the plurality of release coatings 101b. In order to see more clearly the position relationship between each dot 101a in the light guide plate 101 and the corresponding release coating 101b, referring to FIGS. 5 and 6, FIG. 5 is a top view of the front light source module illustrated in FIG. 4, and FIG. 6 is a partially enlarged view of the front light source module illustrated in FIG. 5 at position A. Within the light guide plate 101 in the front light source module 100, an orthographic projection of the release coating 101b on a second surface of the light guide plate 101 is overlapped with an orthographic projection of a dot 101a corresponding to the release coating 101b on the second surface of the light guide plate 101.

The first surface and the second surface of the light guide plate 101 are two planar surfaces opposite to each other in the light guide plate 101. In the case that the front light source module 100 is disposed on the display side of the reflective display, the second surface of the light guide plate 101 in the front light source module 100 is closer to the reflective display relative to the first surface of the light guide plate 101. In the case that the light emitted from the light source 102 is directed into the light guide plate 101, the light is transmitted between the first surface and the second surface of the light guide plate 101 to the side distal from the light source 102 by total reflection. In the case that the light is directed to the dot 101a provided on the first surface of the light guide plate 101, the light is not transmitted to the side distal from the light source 102, but are reflected by the dot 101a toward the second surface of the light guide plate 101, such that the light can be emitted out of the second surface of the light guide plate 101 to be directed to the reflective display.

In the embodiments of the present disclosure, each of the dots 101a disposed on the first surface of the light guide plate 101 is a depressed dot, and the depth of the dots 101a in a direction perpendicular to the first surface of the light guide plate 101 ranges from 2 micrometers to 10 micrometers. It is to be understood that in the case that the orthographic projection of each release coating 101b on the second surface of the light guide plate 101 is overlapped with the orthographic projection of the corresponding dot 101a on the second surface of the light guide plate 101, at least a portion of the release coatings 101b are disposed within the corresponding dot 101a.

In this way, when the front light source module 100 is disposed on the display side of the reflective display, in the case that it is also necessary to provide a cover plate on a side, distal from the reflective display, of the front light source module 100, the cover plate can be directly bonded to the first surface of the light guide plate 101 in the front light source module 100 by the adhesive layer. In this way, in the case that the display device integrating the cover plate, the front light source module 100, and the reflective display is subjected to vacuum de-foaming treatment, or in the case that the display device is subjected to pressing during use, even though a portion of the adhesive in the adhesive layer between the cover plate and the light guide plate 10 enters into the dot 101a, because at least a portion of the release coating 101b is disposed in the corresponding dot 101a, a portion adhesive of the adhesive layer that enters into the dot 101a does not directly contact with the surface of the dot 101a, but contacts with the portion of the release coating 101b disposed within the dot 101a, and the release coating 101b is poorly bonded when bonded to the adhesive layer. The release coating 101b ensures that the portion adhesive of the adhesive layer that enters into the dot 101a has a lower adhesive capacity when bonded with the surface of the dot 101a, such that the portion adhesive that enters into the dot 101a is quickly restored to the state in which the adhesive is not in contact with the dot 101a under the action of the elasticity of the adhesive layer itself. That is, the portion adhesive of the adhesive layer that enters into the dot 101a can be pulled out from the dot 101a, such that the adhesive of the adhesive layer is not present in the dot 101a. In this way, it can be ensured that in the display device integrating the cover plate, the front light source module 100 and the reflective display, the dot 101a always reflects the light emitted from the light source 102 to the reflective display, and in can be ensured that the display effect of the display device is better.

In summary, embodiments of the present disclosure provide a front light source module including a light guide plate and an edge-lit light source. A plurality of dots and a plurality of release coatings in one-to-one correspondence to the plurality of dots are disposed on a first surface of the light guide plate, and an orthographic projection of the release coating on a second surface of the light guide plate is overlapped with an orthographic projection of the dot corresponding to the release coating on the second surface of the light guide plate. In this way, when performing vacuum de-foaming on the display device integrating a cover plate, a front light source module, and a reflective display, or when the display device is pressed during use, even though a portion of the adhesive in the adhesive layer between the cover plate and the light guide plate enters into the dot, because at least a portion of the release coating is disposed in the corresponding dot, and the release coating is poorly bonded when bonded to the adhesive layer, the portion of adhesive that enters into the dot is quickly restored to the state in which the adhesive is not in contact with the dot under the action of the elasticity of the adhesive layer itself. In this way, it can be ensured that in the display device integrating the cover plate, the front light source module and the reflective display, the dots always reflect the light emitted from the light source to the reflective display, and it can be ensured that the display effect of the display device is better.

In the embodiments of the present disclosure, as shown in FIGS. 5 and 6, in the front light source module 100, an orthographic projection of the dot 011a disposed on the first surface of the light guide plate 101 on the second surface of the light guide plate 101 is within an orthographic projection of the corresponding release coating 101b on the second surface of the light guide plate 101. In this way, it can be ensured that the release coating 101b can be coated at any position of the surface of the dot 011a, and can further reduce the bonding ability of a portion adhesive of the adhesive layer that enters into the dot 101a when bonded with the surface of the dot 101a.

Optionally, the size of the orthographic projection of the release coating 101b disposed on the first surface of the light guide plate 101 on the second surface of the light guide plate 101 is greater than the size of the orthographic projection of the corresponding dot 011a on the second surface of the light guide plate 101. It is to be understood that in the process of forming the plurality of release coatings 101b on the first surface of the light guide plate 101, a processing error is always present. Under the influence of the processing error, in the case that the size of the release coating 101b is the same as the size of the corresponding dot 101a, after forming the plurality of release coatings 101b on the first surface of the light guide plate 101, it is difficult to ensure that the orthographic projection of the dot 101a on the second surface of the light guide plate 101 is within the orthographic projection of the corresponding release coating 101b on the second surface of the light guide plate 101. For this reason, the present disclosure increases the size of the release coating 101b. Even though the processing error is present, it can be ensured that, after forming the plurality of release coatings 101b on the first surface of the light guide plate 101, the orthographic projection of each of the dots 101a on the second surface of the light guide plate 101 is within the orthographic projection of the corresponding release coating 101b on the second surface of the light guide plate 101.

In the embodiments of the present disclosure, in any direction, a difference between a width of an orthographic projection of the release coating 101b on the second surface of the light guide plate 101 and a width of an orthographic projection of the corresponding dot 101a on the second surface of the light guide plate is greater than or equal to two times of the target width.

Figure 7:
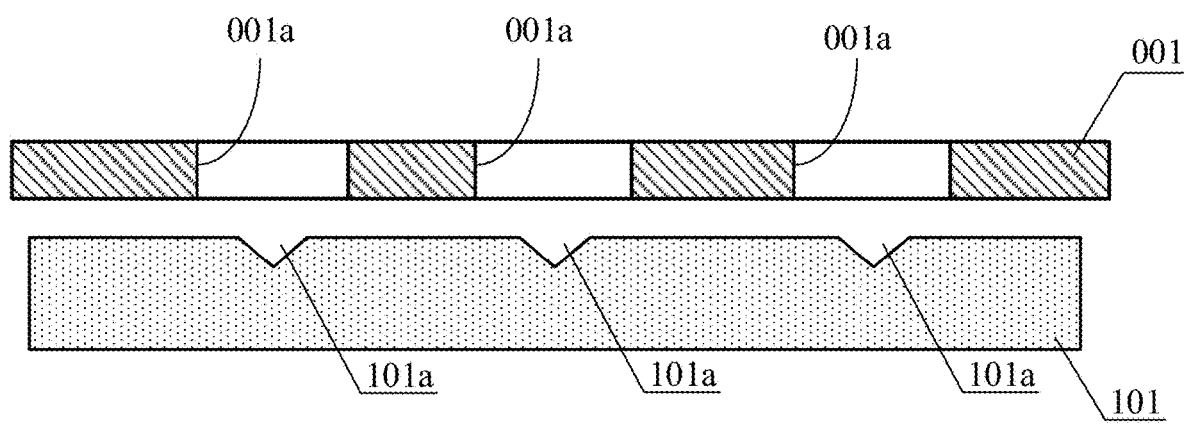
FIG. 7 is a schematic diagram of a light guide plate aligned with a template according to some embodiments of the present disclosure.

The target width is a maximum error width for aligning the light guide plate 101 and the template 001. The template 001 is a tool for forming a plurality of release coatings 101b on the first surface of the light guide plate 101. Referring to FIG. 7, FIG. 7 is a schematic diagram of a light guide plate aligned with a template according to some embodiments of the present disclosure. The template 001 has a plurality of openings 001a in one-to-one correspondence to the plurality of dots 101a. Each of the openings 001a is used to prepare a corresponding release coating 101b at a location of the corresponding dot 101a.

Exemplarily, as shown in FIG. 7, in the case that the plurality of release coatings 101b need to be formed on the first surface of the light guide plate 101, the template 001 is placed on the side, distal from the second surface of the light guide plate 101, of the first surface of the light guide plate 101, and the template 001 and the light guide plate 101 are aligned such that the orthographic projection of each of the openings 001a on the second surface of the light guide plate 101 covers the location of the corresponding orthographic projection of the dot 101a on the second surface of the light guide plate 101. In this way, based on each opening 001a in the template 001, in the case that a corresponding release coating 101b is disposed at the location of the corresponding dot 101a, it can be ensured that the orthographic projection of each dot 101a on the second surface of the light guide plate 101 is within the orthographic projection of the corresponding release coating 101b on the second surface of the light guide plate 101.

In the process of aligning the template 001 with the light guide plate 101, it is necessary to ensure that the axis of each opening 001a in the template 001 coincides with the axis of the corresponding dot 101a in the light guide plate 101. However, in the process of aligning the template 001 with the light guide plate 101, alignment error is always present, resulting in the axis of each opening 001a not coinciding with the axis of the corresponding dot 101a. In the case that the template 001 is aligned with the light guide plate 101, the maximum distance offset between the axis of each opening 001a and the axis of the corresponding dot 101a is the maximum error width for aligning the light guide plate 101 and the template 001.

In this way, in the case that the difference between the width in any direction of the orthographic projection of the release coating 101b on the second surface of the light guide plate 101 and the width in this direction of the orthographic projection of the corresponding dot 101a on the second surface of the light guide plate 101 is greater than or equal to two times of the target width, even though the alignment error is present in the process of aligning the template 001 with the light guide plate 101, it can be ensured that based on the template 001 after the plurality of release coatings 101b prepared on the first surface of the light guide plate 101, the orthographic projection of each dot 101a on the second surface of the light guide plate 101 is within the orthographic projection of the corresponding release coating 101b on the second surface of the light guide plate 101.

Exemplarily, the shape of the orthographic projection of the release coating 101b in the light guide plate 101 on the second surface of the light guide plate 101 is the same as the shape of the orthographic projection of the corresponding dot 101a on the second surface of the light guide plate 101. For example, the orthographic projection of the dot 101a in the light guide plate 101 on the second surface of the light guide plate 101 is a circle with a diameter of 30 micrometers, and i0n the cased that the target width is 10 micrometers, the orthographic projection of the corresponding release coating 101b on the second surface of the light guide plate 101 is a circle with a diameter of 50 micrometers.

In the embodiments of the present disclosure, in a region containing any two dots 101a in the first surface of the light guide plate 101, the ratio of the sum of the areas of the orthographic projections of the release coatings 101b in the region on the light guide plate 101 to the area of the region is less than 50%. In this way, the ratio of the area of the region without the release coating 101b in the first surface of the light guide plate 101 to the area of the first surface of the light guide plate 101 is more than 50%. Because the area of the region without the release coating 101b in the first surface of the light guide plate 101 has a better adhesion with the adhesive layer, when the ratio of the area of the region without the release coating 101b in the first surface of the light guide plate 101 to the area of the first surface of the light guide plate 101 is above 50%, it can be ensured that the subsequent adhesive layer can more firmly bond the cover plate to the first surface of the light guide plate 101.

In the present disclosure, the area of the region without the release coating 101b in the first surface of the light guide plate 101 is related to the density of the dots 101a on the first surface of the light guide plate 101, in addition to the size of each of the release coatings 101b. As shown in FIG. 5, in the embodiments of the present disclosure, in order to ensure a better uniformity of light emission from the second surface of the light guide plate 101 in the front light source module 100, it is necessary to ensure that the density of the dots 101a on the first surface of the light guide plate 101 is gradually increased along the direction distal from the light source 102. In this way, the area of the region with the release coating 101b in the first surface of the light guide plate 101 is gradually increased in the direction away from the light source 102. To this end, the ratio of the area of the region with the release coating 101b in the first surface of the light guide plate 101 to the area of the first surface of the light guide plate 101 is gradually increased in the direction distal from the light source 102.

Exemplarily, the average distance between the dots 101a in the region of the first surface of the light guide plate 101 close to the light source 102 is 200 micrometers. The average distance between the dots 101a in the region of the first surface of the light guide plate 101 in a central region is 150 micrometers. The average distance between the dots 101a in the region of the first surface of the light guide plate 101 distal from the light source 102 is 100 micrometers. The average distance between the dots 101a in a certain region is the average distance between the axes of every two dots 101a in this region.

In this case, a ratio of the sum of the areas of the region with the release coatings 101b of the first surface of the light guide plate 101 close to the light source 102 to the area of the region is 4.9%. A ratio of the area of the region of the first surface of the light guide plate 101 close to the light source 102 in direct contact with the adhesive layer to the area of the region is 95.1%.

The ratio of the sum of the areas of the central region with the release coating 101b of the first surface of the light guide plate 101 to the area of the region is 8.7%. The ratio of the area of the central region of the first surface of the light guide plate 101 in direct contact with the adhesive layer to the area of the region is 91.3%.

The ratio of the sum of the areas of the regions with the release coating 101b of the first surface of the light guide plate 101 distal from the light source 102 to the area of the region is 19.6%. The ratio of the area of the region in direct contact with the adhesive layer of the first surface of the light guide plate 101 distal from the light source 102 to the area of the region is 80.4%.

In the embodiments of the present disclosure, there are various materials used to make the release coating 101b in the front light source module 100. Exemplarily, the material of the release coating 101b includes at least one of: a silicone oil, a release agent, and a hydrophobic agent. For example, in the case that the material of the release coating 101b includes a silicone oil, the silicone oil is a polydimethylsiloxane (PDMS). The main chain structure of the PDMS is as follows.

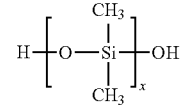

H is elemental hydrogen, O is elemental oxygen, Si is elemental silicon, C is elemental carbon, and x is the quantity of multiple repeating groups contained in the main chain structure.

Due to the low polarity of the Si—O bond in PDMS, the groups to which its Si atoms are attached are composed of non-polar C—H bonds. Therefore, the PDMS is not easily reacted with the adhesive layer, which makes a poor adhesion between the PDMS and the adhesive layer. Moreover, the PDMS has a low surface tension, which can further reduce the adhesion between the PDMS and the adhesive layer.

In summary, embodiments of the present disclosure provide a front light source module including a light guide plate and an edge-lit light source. A plurality of dots and a plurality of release coatings in one-to-one correspondence to the plurality of dots are disposed on a first surface of the light guide plate, and an orthographic projection of the release coating on a second surface of the light guide plate is overlapped with an orthographic projection of the dot corresponding to the release coating on the second surface of the light guide plate. In this way, in the case that the display device integrating a cover plate, a front light source module, and a reflective display is subjected to vacuum de-foaming treatment, or in the case that the display device is pressed during use, even though a portion of the adhesive in the adhesive layer between the cover plate and the light guide plate enters into the dot, because at least a portion of the release coating is disposed in the corresponding dot, and the release coating is poorly bonded when bonded to the adhesive layer, the portion of adhesive that enters into the dot is quickly restored to the state in which the adhesive is not in contact with the dot under the action of the elasticity of the adhesive layer itself. In this way, it can be ensured that in the display device integrating the cover plate, the front light source module and the reflective display, the dots always reflect the light emitted from the light source to the reflective display, and it can be ensured that the display effect of the display device is better.

Figure 8:
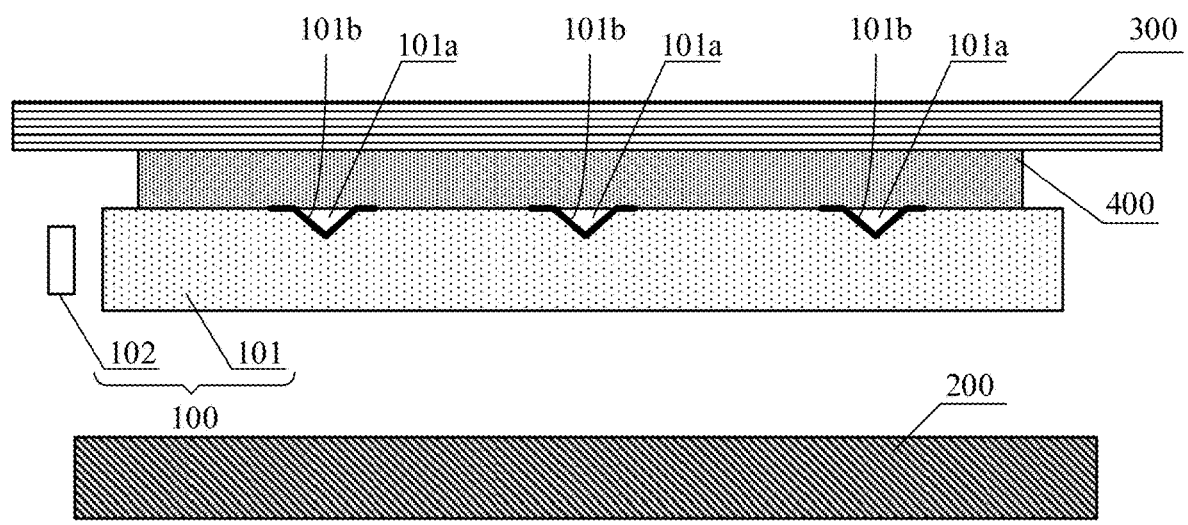
FIG. 8 is a schematic diagram of a film layer structure of a display device according to some embodiments of the present disclosure.

Embodiments of the present disclosure provide a display device. The display device can be a cell phone, a television, a tablet computer, a laptop computer, a monitor, or the like. Referring to FIG. 8, FIG. 8 is a schematic diagram of a film layer structure of a display device 000 according to some embodiments of the present disclosure. The display device 000 includes a reflective display 200, and a front light source module 100 disposed on the display side of the reflective display 200. The front light source module 100 is any of the above front light source modules 100. For example, the front light source module 100 is a front light source module illustrated in FIG. 4.

In the case that the ambient light in the external environment is strong, the front light source module 100 is in a down state, and the ambient light is directed to the reflective display 200, such that the reflective display 200 reflects the ambient light and then present a corresponding display screen. In the case that the ambient light in the external environment is insufficient, the front light source module 100 is in an up state, and the light emitted from the front light source module 100 is directed to the reflective display 200, such that the reflective display 200 can reflect the light and present the corresponding display screen.

The display device 000 further includes a cover plate 300 disposed on the side, distal from the reflective display, of the light guide plate 101 in the front light source module 100, and an adhesive layer 400 disposed between the cover plate 300 and the light guide plate 101. The adhesive layer 400 is bonded to the cover plate 300 and the first surface of the light guide plate 101. The cover plate 300 is a protective panel or a touch panel. The adhesive layer 400 is made of various materials, for example, the adhesive of the adhesive layer 400 is Optically Clear Adhesive (OCA).

In the display device, the orthographic projection of the adhesive layer 400 one the first surface of the light guide plate 101 covers the plurality of dots 101a on the first surface of the light guide plate 101. Because the first surface of the light guide plate 101 in the front light source module 100 also has a plurality of release coatings 101b in one-to-one correspondence to the plurality of dots 101a, and the orthographic projection of the release coatings 101b on the second surface of the light guide plate 101 is overlapped with the orthographic projection of the corresponding dots 101a on the second surface of the light guide plate. Accordingly, in the case that the display device 000 is subjected to a vacuum de-foaming treatment, or in the case that the display device 000 is subjected to pressing during use, even though a portion of the adhesive in the adhesive layer 400 between the cover plate 300 and the light guide plate 101 enters into the dots 101a, because at least a portion of the release coating 101b is disposed in the corresponding dots 101a, and the release coating 101b is poorly bonded with the adhesive layer 400, the portion of adhesive that enters into the dot 101a is quickly restored to the state in which the adhesive is not in contact with the dot 101a under the action of the elasticity of the adhesive layer 400 itself. In this way, it can be ensured that in the display device 000, the dot 101a always reflects the light emitted from the light source 102 to the reflective display 200, and it can be ensured that the display effect of the display device 000 is better.

Moreover, in the case that the orthographic projection of the adhesive layer 400 on the first surface of the light guide plate 101 covers the plurality of dots 101a on the first surface of the light guide plate 101, it can be ensured that the space between the cover plate 300 and the light guide plate 100 can be sufficiently filled by the adhesive layer 400, which can increase the intensity of the light of the ambient light from the external environment directed to the reflective display.

In this case, the adhesive layer 400 is in contact with the first surface of the light guide plate 101. Because at least a portion of the release coating 101b is disposed within the corresponding dot 101a, a portion of the adhesive in the adhesive layer 400 that enters into the dot 101a is not continuously bonded to the surface of the dot 101a, but is quickly restored to a state that is not in contact with the dot 101a under the action of the elasticity of the adhesive layer 400 itself, and the adhesive layer 400 is separated from the dot 101a. That is, the adhesive in the adhesive layer 400 is not disposed in the dot 101a.

In summary, the display device provided by the embodiments of the present disclosure includes a front light source module, a reflective display, a cover plate, and an adhesive layer. The front light source module is disposed on the display side of the reflective display, and the adhesive layer is disposed between the cover plate and a light guide plate in the front light source module. A plurality of dots and a plurality of release coatings in one-to-one correspondence to the plurality of dots are disposed on the first surface of the light guide plate, and an orthographic projection of the release coating on the second surface of the light guide plate is overlapped with an orthographic projection of the corresponding dot on the second surface of the light guide plate. Therefore, in the case that the display device is subjected to vacuum de-foaming treatment, or in the case that the display device is subjected to pressing during use, even though a portion of the adhesive in the adhesive layer between the cover plate and the light guide plate enters into the dots, because at least a portion of the release coatings is disposed in the corresponding dots, and the release coatings is poorly bonded when bonded to the adhesive layer, the portion of the adhesive that enters into the dots is quickly restored to the state in which the adhesive is not in contact with the dot under the action of the elasticity of the adhesive layer itself. In this way, it can be ensured that in the display device, the dots always reflect the light emitted from the light source to the reflective display, and it can be ensured that the display effect of the display device is better.

Figure 9:
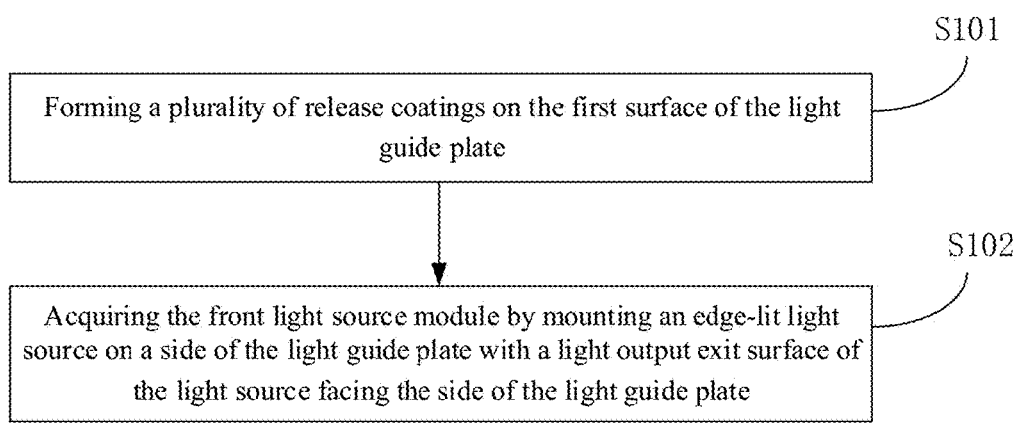
FIG. 9 is a flowchart of a method for manufacturing a front light source module according to some embodiments of the present disclosure.

Embodiments of the present disclosure further provide a method for manufacturing a front light source module. The method for manufacturing the front light source module is configured to prepare the front light source module illustrated in the above embodiments. For example, the method can prepare the front light source module illustrated in FIG. 4. Referring to FIG. 9, FIG. 9 is a flowchart of a method for manufacturing a front light source module according to some embodiments of the present disclosure, and the method for manufacturing the front light source module includes the following steps.

In S101, a plurality of release coatings is formed on the first surface of the light guide plate.

A plurality of dots are disposed on the first surface of the light guide plate, the plurality of dots are in one-to-one correspondence to the plurality of release coatings, an orthographic projection of the release coating on a second surface of the light guide plate is overlapped with an orthographic projection of the dot corresponding to the release coating on the second surface of the light guide plate.

In S102, the front light source module is acquired by mounting an edge-lit light source on a side of the light guide plate with a light output exit surface of the light source facing the side of the light guide plate.

In the case that the front light source module is disposed on the display side of the reflective display, the second surface of the light guide plate is closer to the reflective display relative to the first surface of the light guide plate.

In summary, in the method for manufacturing the front light source module provided by the embodiments of the present disclosure, a plurality of release coatings are formed on the first surface of the light guide plate, the plurality of dots are in one-to-one correspondence to the plurality of release coatings, an orthographic projection of the release coating on a second surface of the light guide plate is overlapped with an orthographic projection of the dot corresponding to the release coating on the second surface of the light guide plate. In this way, in the case that the display device integrating a cover plate, a front light source module, and a reflective display is subjected to vacuum de-foaming treatment, or in the case that the display device is subjected to pressing during use, even though a portion of the adhesive in the adhesive layer between the cover plate and the light guide plate enters into the dot, because at least a portion of the release coating is disposed in the corresponding dot, and the release coating is poorly bonded when bonded to the adhesive layer, the portion of adhesive that enters into the dot is quickly restored to the state in which the adhesive is not in contact with the dot under the action of the elasticity of the adhesive layer itself. In this way, it can be ensured that in the display device integrating the cover plate, the front light source module and the reflective display, the dots always reflect the light emitted from the light source to the reflective display, and it can be ensured that the display effect of the display device is better.

Figure 10:
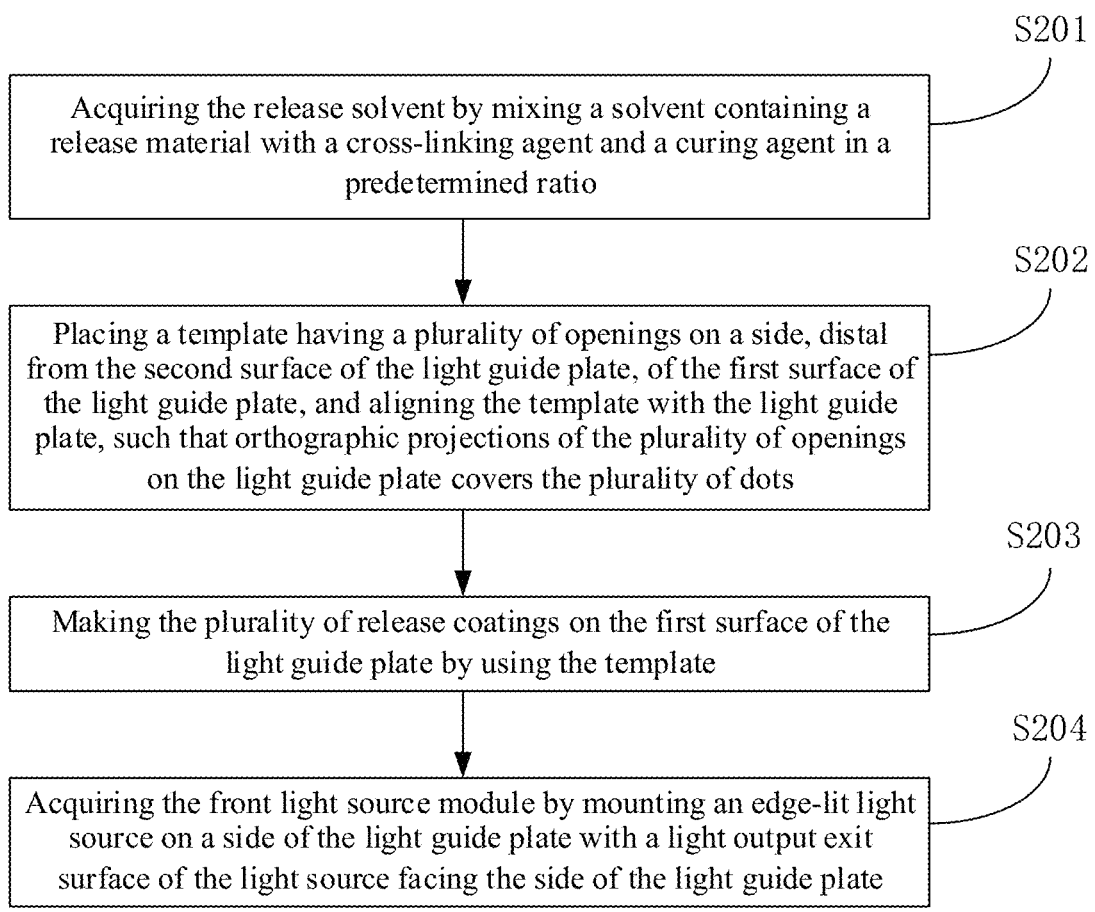
FIG. 10 is a flowchart of another method for manufacturing a front light source module according to some embodiments of the present disclosure.

Referring to FIG. 10, FIG. 10 is a flowchart of another method for manufacturing a front light source module according to some embodiments of the present disclosure. The method for manufacturing the front light source module includes the following steps.

In S201, the release solvent is acquired by mixing a solvent containing a release material with a cross-linking agent and a curing agent in a predetermined ratio.

The release material includes at least one of a silicone oil, a release agent, and a hydrophobic agent.

Exemplarily, in the case that the release material includes a silicone oil and the silicone oil is PDMS, the PDMS is mixed in an aromatic or aliphatic solvent, and a solvent containing PDMS is acquired. Subsequently, the solvent containing PDMS is mixed with a cross-linking agent and a curing agent in a predetermined ratio to acquire the release solvent.

In one possible implementation, the cross-linking agent is dialkyltin dicarboxylate and the curing agent is dibutyltin dicinnamate and dibutyltin diacetate. The solvent containing the PDMS is mixed with the cross-linking and the curing agent in a ratio of 5:4:1.

The PDMS can be coupled with the curing agent, and then an optically transparent elastomeric material can be formed, and this material has a poor adhesion when bonded to the adhesive layer. Moreover, the PDMS can be cross-linked with a cross-linking agent, and after the cross-linking reaction between the PDMS and the cross-linking agent, a single PDMS group can be cross-linked to a molecular group containing a plurality of PDMS groups with a long molecular chain length. In this way, after curing the release solvent, a solid release structure can be acquired, and the adhesion to the adhesive layer at any position in the release structure is poor.

In S202, a template having a plurality of openings is placed on a side, distal from the second surface of the light guide plate, of the first surface of the light guide plate, and aligning the template with the light guide plate, such that orthographic projections of the plurality of openings on the light guide plate covers the plurality of dots.

A plurality of dots are disposed on the first surface of the light guide plate, and the plurality of dots are in one-to-one correspondence to the plurality of openings in the template.

Exemplarily, as shown in FIG. 7, in the case that the template 001 is disposed on the side, distal from the second surface, of the first surface of the light guide plate 101, the template 001 is aligned with the light guide plate 101 by the charge coupled device (CCD) alignment technology. In the case that the template 001 is aligned with the light guide plate 101, the orthographic projection of the opening 001a in the template 001 on the light guide plate 101 covers the corresponding dot 101a.

In S203, the plurality of release coatings are made on the first surface of the light guide plate by using the template.

In the present disclosure, in the case that the template is aligned with the light guide plate, the plurality of release coatings are made on the first surface of the light guide plate by using the template.

Exemplarily, each of the openings in the template is used to make one release coating. In this way, in the case that the template is aligned with the light guide plate, the orthographic projection of the opening in the template on the light guide plate covers the corresponding dot. Therefore, in the case that a corresponding release coating is made on the first surface of the light guide plate based on each opening in the template, it can be ensured that the orthographic projection of the dot in the light guide plate on the second surface of the light guide plate is within the orthographic projection of the corresponding release coating on the second surface of the light guide plate.

In embodiments of the present disclosure, different processes are applied to make the release coating on the first surface of the light guide plate, and the structure of the template applied to the different processes is different. For example, the template is a reticular plate, such that a screen printing process is applied to produce the release coating on the first surface of the light guide plate. For another example, the template is a mask plate, such that a composition process is applied to produce the release coating on the first surface of the light guide plate. In this way, the embodiments of the present disclosure are illustrated by way of example of the following two optional implementations.

In a first optional implementation, in the case that the template is a reticular plate, making a plurality of release coatings on a first surface of the light guide includes the following steps.

In A1, a release solvent is placed on a side, distal from the light guide plate, of the reticular plate.

In the embodiments of the present disclosure, the release solvent prepared in S201 can be placed on the side, distal from the light guide plate, of the reticular plate in the case that the reticular plate and the light guide plate are aligned.

In B1, the release solvent is caused to flow through the openings to the first surface of the light guide plate by moving a scraper on a reticular surface of the reticular plate.

In the embodiments of the present disclosure, in the case that the release solvent is placed on the side, distal from the light guide plate, of the reticular plate, a scraper is moved on the reticular plate surface. In this way, the scraper, in the case that the release solvent is moved on the reticular plate surface, allows the release solvent to flow from the plurality of openings of the reticular plate to the first surface of the light guide plate.

Because upon the alignment process to the reticular plate with the light guide plate, the orthographic projection of the opening in the reticular plate on the light guide plate covers the corresponding dot, in the case that the release solvent flows from the plurality of openings in the reticular plate to the first surface of the light guide plate, the release solvent is distributed at the location of each of the dots in the first surface of the light guide plate.

In C1, the plurality of release coatings are acquired by applying a fixing treatment to the release solvent on the first surface of the light guide plate.

In the embodiments of the present disclosure, in the case that the release solvent flows from the plurality of openings of the reticular plate to the first surface of the light guide plate, the release solvent on the first surface of the light guide plate is fixed by heat curing to acquire the plurality of release coatings.

Exemplarily, the light guide plate distributed with the release solvent is subjected to an environment at a temperature of 80° C., and upon a specified curing period, a solid release coating is formed on the first surface of the light guide plate, and a thickness of the release coating ranges from 0.5 micrometers to 1 micrometer. The specified curing duration ranges from 30 seconds to 60 seconds.

In a second optional implementation, in the case that the template is a mask plate, making the plurality of release coatings on the first surface of the light guide plate includes the following steps.

In A2, a release film in a whole layer is acquired by applying a release solvent on the first surface of the light guide plate and curing the release solvent.

In embodiments of the present disclosure, prior to the alignment process to the mask plate and the light guide plate, the release solvent prepared in S201 is coated on the first surface of the light guide plate. The release solvent on the first surface of the light guide plate can be fixed by heat curing to acquire the release film in the whole layer. The method for fixing the release solvent can be referred to the corresponding contents in C1, and is not repeated herein.

In B2, the plurality of release coatings are acquired by patterning the release film using the mask plate.

In the embodiments of the present disclosure, upon forming the release film in a whole layer on the first surface of the light guide plate, the mask plate is aligned with the light guide plate, and the mask plate can be employed to graphically process the release film to acquire a plurality of release coatings.

The process of patterning the release film using the mask plate includes photoresist coating, exposure, developing, etching, and photoresist stripping.

In S204, the front light source module is acquired by mounting an edge-lit light source on a side of the light guide plate with a light output exit surface of the light source facing the side of the light guide plate.

In the embodiment of the present disclosure, upon forming a plurality of release coatings on the first surface of the light guide plate, the an edge-lit light source is mounted on the side of the light guide plate, and the light output exit surface of the light source faces the side of the light guide plate, such that the front light source module is acquired.

It should be noted that the principle of the front light source module in the above embodiment can be referred to the corresponding content in the above structure embodiment of the front light source module, which his not repeated herein.

In summary, in the method for manufacturing the front light source module provided by the embodiments of the present disclosure, a plurality of release coatings are formed on the first surface of the light guide plate, the plurality of dots are in one-to-one correspondence to the plurality of release coatings, an orthographic projection of the release coating on a second surface of the light guide plate is overlapped with an orthographic projection of the dot corresponding to the release coating on the second surface of the light guide plate. In this way, in the case that the display device integrating a cover plate, a front light source module, and a reflective display is subjected to vacuum de-foaming treatment, or in the case that the display device is subjected to pressing during use, even though a portion of the adhesive in the adhesive layer between the cover plate and the light guide plate enters into the dot, because at least a portion of the release coating is disposed in the corresponding dot, and the release coating is poorly bonded when bonded to the adhesive layer, the portion of adhesive that enters into the dot is quickly restored to the state in which the adhesive is not in contact with the dot under the action of the elasticity of the adhesive layer itself. In this way, it can be ensured that in the display device integrating the cover plate, the front light source module and the reflective display, the dots always reflect the light emitted from the light source to the reflective display, and it can be ensured that the display effect of the display device is better.

It is to be noted that in the accompanying drawings, the dimensions of the layers and regions may be exaggerated for the clarity of illustration. And it should be understood that when an element or layer is referred to as being "on" another element or layer, it may be directly on the other element or an intermediate layer may be present. In addition, it should be understood that when the element or layer is referred to as being "under" another element or layer, it can be directly under the other element, or more than one intermediate layer or element can be present. It should also be understood that when a layer or element is referred to as being "between" two layers or elements, it may be the only layer between the two layers or elements, or more than one intermediate layer or element may also be present. Similar reference marks throughout indicate similar elements.

In the application, the terms "first" and "second" are used for descriptive purposes only and are not to be construed as indicating or implying relative importance. The term "plurality" refers to two or more, unless otherwise expressly limited.

The foregoing are only optional embodiments of the present disclosure and are not intended to limit the application, and any modifications, equivalent substitutions, improvements, etc., within the spirit and principles of the present disclosure shall be included in the scope of protection of the present disclosure.

What is claimed is:

1. A front light source module, configured to be arranged on a display side of a reflective display, the front light source module comprising: a light guide plate and an edge-lit light source; wherein a light exit surface of the light source faces a side of the light guide plate; and a plurality of dots and a plurality of release coatings in one-to-one correspondence to the plurality of dots are disposed on a first surface of the light guide plate, and an orthographic projection of the release coating on a second surface of the light guide plate is overlapped with an orthographic projection of the dot corresponding to the release coating on the second surface of the light guide plate;

wherein the first surface and the second surface are two planar surfaces of the light guide plate opposite to each other, and in the case that the front light source module is disposed on the display side of the reflective display, the second surface of the light guide plate is closer to the reflective display relative to the first surface of the light guide plate.

2. The front light source module according to claim 1, wherein the orthographic projection of the dot on the second surface of the light guide plate is within the orthographic projection of the release coating corresponding to the dot on the second surface of the light guide plate.

3. The front light source module according to claim 2, wherein a size of the orthographic projection of the release coating on the second surface of the light guide plate is greater than a size of the orthographic projection of the dot corresponding to the release coating on the second surface of the light guide plate.

4. The front light source module according to claim 2, wherein in a region comprising any two of the dots in the first surface of the light guide plate, a ratio of a sum of areas of orthographic projections of the release coatings in the region on the light guide plate to an area of the region is less than 50%.

5. The front light source module according to claim 1, wherein materials configured to make the release coating comprises at least one of a silicone oil, a release agent and a hydrophobic agent.

6. The front light source module according to claim 1, wherein the dots are depressed dots, and a depth of the dots in a direction perpendicular to the first surface ranges from 2 micrometers to 10 micrometers.

7. The front light source module according to claim 1, wherein a density of the dots on the first surface of the light guide plate gradually increases in a direction away from the light source.

8. The front light source module according to claim 1, wherein a difference, in any direction, between a width of the orthographic projection of the release coating on the second surface of the light guide plate and a width of the orthographic projection of the dot corresponding to the release coating on the second surface of the light guide plate is greater than or equal to two times of a target width;

wherein the target width is a maximum error width for aligning the light guide plate with a template, the template has a plurality of openings in one-to-one correspondence to the plurality of dots, and the openings are configured to prepare the release coatings at locations of the corresponding dots.

9. A display device, comprising: a reflective display, and a front light source module disposed on a display side of the reflective display, wherein the front light source module comprises: a light guide plate and an edge-lit light source; wherein a light exit surface of the light source faces a side of the light guide plate; and a plurality of dots and a plurality of release coatings in one-to-one correspondence to the plurality of dots are disposed on a first surface of the light guide plate, and an orthographic projection of the release coating on a second surface of the light guide plate is overlapped with an orthographic projection of the dot corresponding to the release coating on the second surface of the light guide plate;

wherein the first surface and the second surface are two planar surfaces of the light guide plate opposite to each other, and in the case that the front light source module is disposed on the display side of the reflective display, the second surface of the light guide plate is closer to the reflective display relative to the first surface of the light guide plate.

10. The display device according to claim 9, further comprising: a cover plate disposed on a side, distal from the reflective display, of the light guide plate in the front light source module, and an adhesive layer disposed between the cover plate and the light guide plate, wherein the adhesive layer is bonded to the cover plate and the light guide plate.

11. The display device according to claim 10, wherein an orthographic projection of the adhesive layer on the first surface of the light guide plate covers the plurality of dots on the first surface of the light guide plate.

12. The display device according to claim 11, wherein the adhesive layer is in contact with the first surface of the light guide plate and is separated from the dots.

13. The display device according to claim 9, wherein the orthographic projection of the dot on the second surface of the light guide plate is within the orthographic projection of the release coating corresponding to the dot on the second surface of the light guide plate.

14. The display device according to claim 13, wherein a size of the orthographic projection of the release coating on the second surface of the light guide plate is greater than a size of the orthographic projection of the dot corresponding to the release coating on the second surface of the light guide plate.

15. The display device according to claim 13, wherein in a region comprising any two of the dots in the first surface of the light guide plate, a ratio of a sum of areas of orthographic projections of the release coatings in the region on the light guide plate to an area of the region is less than 50%.

16. The display device according to claim 9, wherein materials configured to make the release coating comprises at least one of a silicone oil, a release agent and a hydrophobic agent.

17. A method for manufacturing a front light source module, comprising:

forming a plurality of release coatings on a first surface of a light guide plate, wherein a plurality of dots are disposed on the first surface of the light guide plate, the plurality of dots are in one-to-one correspondence to the plurality of release coatings, an orthographic projection of the release coating on a second surface of the light guide plate is overlapped with an orthographic projection of the dot corresponding to the release coating on the second surface of the light guide plate;

acquiring the front light source module by mounting an edge-lit light source on a side of the light guide plate with a light exit surface of the light source facing the side of the light guide plate;

wherein the first surface and the second surface are two planar surfaces of the light guide plate opposite to each other, and in the case that the front light source module is disposed on the display side of the reflective display, the second surface of the light guide plate is closer to the reflective display relative to the first surface of the light guide plate.

18. The method according to claim 17, wherein forming the plurality of release coatings on the first surface of the light guide plate comprises:
   placing a template having a plurality of openings on a side, distal from the second surface of the light guide plate, of the first surface of the light guide plate, and aligning the template with the light guide plate, such that orthographic projections of the plurality of openings on the light guide plate cover the plurality of dots; and
   making the plurality of release coatings on the first surface of the light guide plate by using the template.

19. The method according to claim 18, wherein
the template is a reticular plate, and making the plurality of release coatings on the first surface of the light guide plate comprises:
   placing a release solvent on a side, distal from the light guide plate, of the reticular plate,
   causing the release solvent to flow through the openings to the first surface of the light guide plate by moving a scraper on a reticular surface of the reticular plate, and
   acquiring the plurality of release coatings by applying a fixing treatment to the release solvent on the first surface of the light guide plate;
or
the template is a mask plate, and making the plurality of release coatings on the first surface of the light guide plate comprises:
   acquiring a release film in a whole layer by applying a release solvent on the first surface of the light guide plate and curing the release solvent, and
   acquiring the plurality of release coatings by patterning the release film using the mask plate.

20. The method according to claim 19, wherein prior to making the plurality of release coatings on the first surface of the light guide plate, the method comprises:
   acquiring the release solvent by mixing a solvent containing a release material with a cross-linking agent and a curing agent in a predetermined ratio;
   wherein the release material comprises at least one of a silicone oil, a release agent and a hydrophobic agent.

* * * * *